United States Patent
Hu et al.

(10) Patent No.: US 11,247,442 B2
(45) Date of Patent: Feb. 15, 2022

(54) SEALING FILM SUITABLE FOR FOOD PACKAGING AND PREPARATION METHOD THEREOF

(71) Applicant: HANGZHOU KENENG NEW MATERIAL TECHNOLOGY CO., LTD., Zhejiang (CN)

(72) Inventors: Guangquan Hu, Zhejiang (CN); Jiaming Zhang, Zhejiang (CN)

(73) Assignee: HANGZHOU KENENG NEW MATERIAL TECHNOLOGY CO., LTD., Zhejiang (CN)

( * ) Notice: Subject to any disclaimer, the term of this patent is extended or adjusted under 35 U.S.C. 154(b) by 0 days.

(21) Appl. No.: 17/002,789

(22) Filed: Aug. 26, 2020

(65) Prior Publication Data

US 2020/0384744 A1 Dec. 10, 2020

Related U.S. Application Data

(62) Division of application No. 15/861,636, filed on Jan. 3, 2018, now Pat. No. 10,800,147.

(30) Foreign Application Priority Data

Dec. 11, 2017 (CN) .......................... 201711314593.9

(51) Int. Cl.
  *B32B 27/08* (2006.01)
  *B32B 7/12* (2006.01)
  (Continued)

(52) U.S. Cl.
  CPC .............. *B32B 27/08* (2013.01); *B29B 7/002* (2013.01); *B29B 7/7461* (2013.01);
  (Continued)

(58) Field of Classification Search
  None
  See application file for complete search history.

(56) References Cited

U.S. PATENT DOCUMENTS 3,869,422 A * 3/1975 Dawes ................ C08L 23/0869
  524/522
5,152,947 A * 10/1992 Takeda .................... B29C 41/26
  264/207
(Continued)

FOREIGN PATENT DOCUMENTS

CN 203697609 7/2014
CN 105059707 11/2015
(Continued)

OTHER PUBLICATIONS

"Panasonic UV Curing System—AiCure Series" (Nov. 2016). (Year: 2016).*
"Omnicure—UV Curing Systems" (2016) (Year: 2016).*

*Primary Examiner* — Vivian Chen
(74) *Attorney, Agent, or Firm* — JCIPRNET

(57) ABSTRACT

A sealing film suitable for food packaging is disclosed, which adopts the following solution. The sealing film comprises, in sequence, a PET layer, a VMPET layer and a PE layer from outside to inside, wherein the PE layer comprises 100-110 parts of PE, 15-20 parts of EVA, 15-20 parts of EAA, 55-60 parts of HDPE and 10-15 parts of LLDPE in parts by mass. In this manner, the addition of HDPE and LLDPE into the PE layer is intended to enhance the tensile strength of the sealing film.

4 Claims, 1 Drawing Sheet

(51) Int. Cl.
| | |
|---|---|
| B32B 9/02 | (2006.01) |
| B29C 48/08 | (2019.01) |
| B29B 9/06 | (2006.01) |
| B29B 7/74 | (2006.01) |
| B29C 48/40 | (2019.01) |
| B29B 7/00 | (2006.01) |
| B29C 48/00 | (2019.01) |
| B29C 48/345 | (2019.01) |
| B29C 48/07 | (2019.01) |
| B32B 27/30 | (2006.01) |
| B32B 27/42 | (2006.01) |
| B32B 9/04 | (2006.01) |
| B32B 27/32 | (2006.01) |
| C09J 129/04 | (2006.01) |
| C09J 123/08 | (2006.01) |
| C09J 123/06 | (2006.01) |
| C09J 105/00 | (2006.01) |
| C08K 3/34 | (2006.01) |
| C08K 5/00 | (2006.01) |
| C08K 3/015 | (2018.01) |
| C08K 5/21 | (2006.01) |
| C08K 3/01 | (2018.01) |
| C08L 23/08 | (2006.01) |
| C08L 29/04 | (2006.01) |
| C08L 5/00 | (2006.01) |
| C08L 23/06 | (2006.01) |

(52) U.S. Cl.
CPC ............ *B29B 7/7485* (2013.01); *B29B 9/06* (2013.01); *B29C 48/0018* (2019.02); *B29C 48/0022* (2019.02); *B29C 48/08* (2019.02); *B29C 48/345* (2019.02); *B29C 48/40* (2019.02); *B32B 7/12* (2013.01); *B32B 9/02* (2013.01); *B29C 48/07* (2019.02); *B32B 9/04* (2013.01); *B32B 9/045* (2013.01); *B32B 27/306* (2013.01); *B32B 27/308* (2013.01); *B32B 27/32* (2013.01); *B32B 27/42* (2013.01); *B32B 2250/05* (2013.01); *B32B 2250/24* (2013.01); *B32B 2255/10* (2013.01); *B32B 2255/205* (2013.01); *B32B 2270/00* (2013.01); *B32B 2307/31* (2013.01); *B32B 2307/7145* (2013.01); *B32B 2307/7242* (2013.01); *B32B 2307/7265* (2013.01); *B32B 2323/04* (2013.01); *B32B 2323/043* (2013.01); *B32B 2323/046* (2013.01); *B32B 2329/04* (2013.01); *B32B 2331/04* (2013.01); *B32B 2367/00* (2013.01); *B32B 2439/70* (2013.01); *C08K 3/01* (2018.01); *C08K 3/015* (2018.01); *C08K 3/34* (2013.01); *C08K 5/0025* (2013.01); *C08K 5/0058* (2013.01); *C08K 5/21* (2013.01); *C08L 5/00* (2013.01); *C08L 23/06* (2013.01); *C08L 23/0853* (2013.01); *C08L 23/0869* (2013.01); *C08L 29/04* (2013.01); *C08L 2203/16* (2013.01); *C08L 2203/162* (2013.01); *C08L 2205/02* (2013.01); *C08L 2205/025* (2013.01); *C08L 2205/035* (2013.01); *C08L 2205/05* (2013.01); *C08L 2207/06* (2013.01); *C08L 2207/062* (2013.01); *C09J 105/00* (2013.01); *C09J 123/06* (2013.01); *C09J 123/0846* (2013.01); *C09J 123/0853* (2013.01); *C09J 123/0869* (2013.01); *C09J 129/04* (2013.01); *C09J 2301/416* (2020.08); *C09J 2467/006* (2013.01); *Y10T 428/1338* (2015.01); *Y10T 428/1341* (2015.01); *Y10T 428/1352* (2015.01); *Y10T 428/1355* (2015.01); *Y10T 428/1359* (2015.01); *Y10T 428/1379* (2015.01); *Y10T 428/1383* (2015.01); *Y10T 428/2495* (2015.01); *Y10T 428/24942* (2015.01); *Y10T 428/24967* (2015.01); *Y10T 428/24975* (2015.01); *Y10T 428/2817* (2015.01); *Y10T 428/2826* (2015.01); *Y10T 428/2878* (2015.01); *Y10T 428/2891* (2015.01); *Y10T 428/31681* (2015.04); *Y10T 428/31692* (2015.04); *Y10T 428/31699* (2015.04); *Y10T 428/31786* (2015.04); *Y10T 428/31797* (2015.04); *Y10T 428/31913* (2015.04); *Y10T 428/31928* (2015.04); *Y10T 428/31938* (2015.04)

(56) References Cited

U.S. PATENT DOCUMENTS

| | | | |
|---|---|---|---|
| 5,770,318 A * | 6/1998 | Friedman | C08L 23/0815 264/176.1 |
| 5,939,205 A | 8/1999 | Yokoyama et al. | |
| 10,800,147 B2 * | 10/2020 | Hu | B29B 7/7485 |
| 2003/0044552 A1 * | 3/2003 | Komada | B32B 27/08 428/35.7 |
| 2003/0161976 A1 * | 8/2003 | Rea | C08F 220/04 428/35.7 |
| 2005/0163960 A1 * | 7/2005 | Lapin | C09J 5/00 428/41.5 |
| 2005/0247960 A1 | 11/2005 | Rim et al. | |
| 2006/0003123 A1 * | 1/2006 | Nageli | B32B 7/12 428/35.7 |
| 2009/0285870 A1 | 11/2009 | Narita et al. | |
| 2010/0092793 A1 | 4/2010 | Aithani et al. | |
| 2012/0028058 A1 * | 2/2012 | Paolilli | B32B 15/08 428/457 |
| 2013/0065071 A1 * | 3/2013 | Bonavoglia | B32B 27/08 428/523 |
| 2015/0367602 A1 * | 12/2015 | Iwaya | B32B 27/08 428/522 |
| 2018/0339498 A1 * | 11/2018 | Zborowski | B32B 27/32 |

FOREIGN PATENT DOCUMENTS

| | | |
|---|---|---|
| CN | 106915123 | 7/2017 |
| CN | 107353553 | 11/2017 |
| JP | 57-165472 A * | 10/1982 |
| KR | 101693502 | 1/2017 |

* cited by examiner

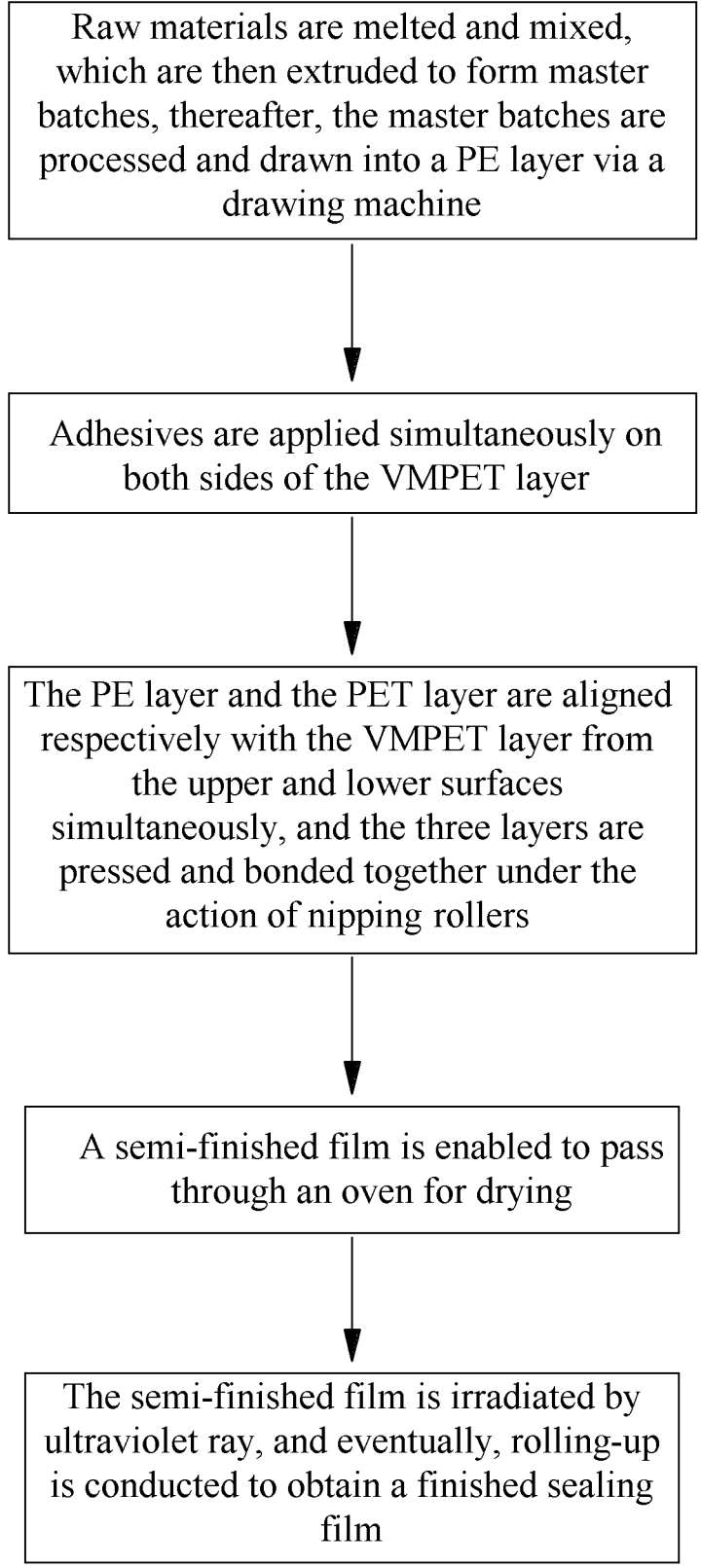

SEALING FILM SUITABLE FOR FOOD PACKAGING AND PREPARATION METHOD THEREOF

CROSS-REFERENCE TO RELATED APPLICATION

This application is a divisional application of and claims the priority benefit of a prior application Ser. No. 15/861,636, filed on Jan. 3, 2018, now allowed. The prior application Ser. No. 15/861,636 claims the priority benefit of China application serial no. 201711314593.9, filed on Dec. 11, 2017. The entirety of each of the above-mentioned patent applications is hereby incorporated by reference herein and made a part of this specification.

BACKGROUND

1. Field of the Invention

The present invention relates to the field of food packaging, and more particularly, to a sealing film suitable for food packaging and a preparation method thereof.

2. Description of Related Art

With the techniques of food processing and production becoming increasingly advanced, varieties in food also keep growing. In view of this, based on storage requirements for different food, some food needs to be contained in a barrel-like or cup-like container for storage. For this purpose, an opening of the container needs to be sealed with a sealing film so as to prolong the storage time of food.

However, many sealing films that are currently available on the market tend to be subjected to such problems as deformation and even tearing as a result of their excessively low anti-stretching strength in the process of unsealing by manual pulling, thus directly making it inconvenient for people to pick up food. Consequently, there is a need to make improvements on sealing films.

SUMMARY

It is an objective of the present invention to provide a sealing film suitable for food packaging and preparation method thereof. The sealing film is featured by relatively strong tensile strength, which is thus able to avoid the problems of deformation and tearing during pulling, thus facilitating the splitting of food packaging.

The above objective of the present invention is accomplished through the following technical solution: a sealing film suitable for food packaging is provided, which is characterized in that the sealing film comprises, in sequence, a PET layer, a VMPET (vacuum metalized polyethylene terephthalate) layer and a PE layer from outside to inside, wherein the PE layer comprises 100-110 parts of PE, 15-20 parts of EVA (ethylene vinyl acetate), 15-20 parts of EAA (ethylene acrylic acid), 55-60 parts of HDPE and 10-15 parts of LLDPE in parts by mass.

With the adoption of the above technical solution, HDPE and LLDPE are added into the PE layer, which may effectively enhance the tensile properties of the PE layer. As such, when the PE layer combines with the PET layer and the VMPET layer to form a sealing film, the sealing film will also have better tensile properties.

Meanwhile, the added EVA may enhance heat-sealing properties of the PE layer, which may reduce the probability that the sealing film is fractured during heating of food, thus helping ensure the sanitary safety of food. Moreover, EAA helps improve barrier properties of PE, which enables the sealing film to effectively isolate food from ambient air during daily storage, thereby further prolonging the storage time of food.

Preferably, the PE layer also comprises 2-5 parts by mass of shell powder.

Preferably, the shell powder is treated with an enzyme solution containing alkaline protease, papain and trypsin.

With the adoption of the above technical solution, as shell powder primarily comprises calcium carbonate and contains a small amount of calcium compounds, such as calcium oxide and calcium hydroxide, it may expedite setting of the PE layer during processing. Moreover, the shell powder itself is of a porous fibrous double-helix structure, which is thus able to adsorb molecules of other components, thereby avoiding molecules of the PE layer from migrating to food upon accidental contact therewith.

Meanwhile, the shell powder treated by the enzyme solution not only retains its intrinsic properties, but also releases chitosan therefrom. Moreover, as chitosan itself has strong antibacterial and bactericidal abilities, the shell powder after treatment may also help inhibit such pathogenic bacteria as Escherichia coli from propagating on the sealing film. Moreover, the shell powder with chitosan also has enhanced bonding effects, which may further ensure the bonding strength among various components, and thus the probability of small molecules' migration to food is reduced. Besides, this also enhances the tensile strength of the PE layer itself, such that the PE layer will not be torn readily during unsealing.

Preferably, the PET layer has a thickness of 1-3 μm, the VMPET layer has a thickness of 2-6 μm, the PE layer has a thickness of 2-4 μm, and both the bonding between the PET layer and the VMPET layer and that between the VMPET layer and the PE layer are achieved with an adhesive.

With the adoption of the above technical solution, an adhesive is used to bond the PET layer and the PE layer to the VMPET layer respectively. In this manner, the connection among the three layers may be enhanced, thereby further improving the tensile strength of the sealing film.

Preferably, the adhesive is formed by the mixing of corn flour, an anionic surfactant, carbonyl diamide (urea), acrylic acid, polyvinyl alcohol and a photo-curing agent.

With the adoption of the above technical solution, first, as most components of the adhesive are water-based, the adhesive meets requirements of environmental protection. In addition, as polyvinyl alcohol is hydrophobic and acrylic acid can promote mutual dissolution of polyvinyl alcohol with water, the uniformity and stability of the adhesive are ensured, thereby enhancing the bonding ability of the adhesive. Meanwhile, when the adhesive is cured, water and acrylic acid will volatilize, and at this point, the hydrophobicity of polyvinyl alcohol will be manifested. As such, firm bonding among layers may be ensured, thus prolonging the service life of the sealing film.

A preparation method of a sealing film suitable for food packaging is provided, which comprises the following steps:
S1. a first pair of nipping rollers having adhesives on surfaces thereof is used to clamp a VMPET layer for rolling delivery so as to apply adhesives on both surfaces of the VMPET layer;
S2. a PET layer and a PE layer are positioned respectively on both sides of the VMPET layer to be glued to the VMPET layer;

S3. the PET layer, the PE layer and the VMPET layer are enabled to pass between a second pair of nipping rollers simultaneously, which are then squeezed and clamped to obtain a semi-finished film; and S4. the semi-finished film is enabled to pass through an oven for drying; thereafter, it is delivered through a UV chamber to be irradiated by ultraviolet ray; after that, rolling-up is conducted at an end to obtain a finished sealing film.

With the adoption of the above technical solution, nipping rollers are utilized to apply adhesives on the VMPET layer simultaneously. In this manner, the efficiency of adhesive application may be improved. More importantly, both sides of the VMPET layer may be subjected to squeezing of the same force simultaneously during adhesive application, which helps prevent the VMPET layer from being fractured.

Preferably, the preparation method of the PE layer is as follows: all raw materials are added into a mixer for melting and mixing according to prescribed mass parts; thereafter, they are transferred to a twin-screw extruder for extrusion and pelletization to obtain PE master batches; then, the PE master batches are added into a drawing machine to be drawn into a film.

The adoption of the above technical solution ensures that various raw materials of the PE layer may be evenly mixed, which facilitates the improvement on anti-stretching properties of the PE layer, thus reducing the probability of tearing the PE layer.

Preferably, the intensity of ultraviolet ray is 30,000 $W/(s \cdot cm^2)$, and the delivery time of the semi-finished film in the UV chamber is 5 seconds.

With the adoption of the above technical solution, in general, pathogenic bacteria will all be inactivated when irradiated by ultraviolet ray having an intensity of 30,000 $W/(s \cdot cm^2)$ for 1 second. In other words, this feature has sterilization effects on the sealing film. Moreover, as the photo-curing agent is a constituent part of the adhesive, the curing efficiency of the adhesive may be further improved under irradiation by ultraviolet ray, thereby enhancing the bonding strength among the three films within a short time.

Preferably, during drying in the oven, hot air in the oven is blown to the semi-finished film in the direction perpendicular to the surfaces on both sides of the semi-finished film, and hot air blown from the two sides is symmetrical with respect to the semi-finished film.

With the adoption of the above technical solution, hot air may be blown simultaneously towards the semi-finished film from symmetrical directions, which not only improves the curing efficiency of the adhesive, but also ensures that the semi-finished film is uniformly stressed, thereby reducing damage caused to the semi-finished film.

In conclusion, the present invention has the following beneficial effects:

1. The addition of HDPE and LLDPE into the PE layer renders it a composite material, which enhances the sealing film's anti-stretching strength while ensuring its intrinsic characteristics;

2. The PE layer is also added with the shell powder treated by the enzyme solution, wherein the shell powder can not only further enhance the connection strength among molecules within the PE layer, but also facilitate the improvement on the overall antibacterial property of the sealing film, thereby helping prolong the storage time of food;

3. Conducting simultaneous adhesive application for the sealing film by means of nipping rollers not only improves the efficiency of adhesive application for the sealing film, but also reduces the probability of damaging the sealing film as a result of stress imbalance; and 4. Irradiating the sealing film with ultraviolet ray can not only trigger the curing effects of the photo-curing agent to enhance the curing effects of the adhesive, but also further sterilize the sealing film, thus facilitating the improvement on the quality of food packaging.

BRIEF DESCRIPTION OF THE DRAWINGS

FIG. 1 is a flow diagram illustrating a preparation process for a sealing film suitable for food packaging.

DESCRIPTION OF THE EMBODIMENTS

The present invention will be further illustrated below in combination with FIG. 1.

Embodiment 1

A preparation method of a sealing film suitable for food packaging is provided, which comprised the following steps:

Step 1: Preparation of a PE layer: 100 Kg of PE, 15 Kg of EVA, 15 Kg of EAA, 55 Kg of HDPE and 10 Kg of LLDPE are added into a mixer. Heating is conducted to make the temperature reach 135° C. for melting and even mixing. Thereafter, the raw materials are transferred to a twin-screw extruder for extrusion and pelletization to obtain PE master batches. Then, the PE master batches are added into a drawing machine to be drawn into a PE layer having a thickness of 2 μm.

Step 2: A VMPET layer having a thickness of 2 μm is enabled to pass between a first pair of nipping rollers. The first pair of nipping rollers grasped the VMPET layer, and adhesives on the first pair of nipping rollers are applied evenly on the upper and lower surfaces of the VMPET layer.

Step 3: A PE layer having a thickness of 4 μm and a PET layer having a thickness of 2 μm are enabled to pass above and below the first pair of nipping rollers to be butted respectively with the upper and lower surfaces of the VMPET layer in an accurate manner. Meanwhile, the two layers are also enabled to pass between a second pair of nipping rollers. At this point, the PE layer, the VMPET layer and the PET layer, which are squeezed by the second pair of nipping rollers, are bonded together tightly to form a semi-finished film.

Step 4: The semi-finished film is delivered through an oven, wherein the temperature of the oven is 80° C., and the delivery time is 1 minute. Moreover, hot air blown from the oven is blown towards the semi-finished film from the upper and lower sides of the semi-finished film and in the direction perpendicular to the semi-finished film. Meanwhile, hot air blown from the upper and lower sides is symmetrical with respect to the semi-finished film.

Step 5: After being delivered through the oven, the semi-finished film is enabled to pass through a UV chamber, wherein the intensity of ultraviolet ray of the UV chamber is 30,000 $W/(s \cdot cm^2)$, and the duration time is 5 seconds. Finally, the semi-finished film is rolled up at an end to obtain a finished sealing film.

Here, the adhesive is formed by the mixing of corn flour, an anionic surfactant, carbonyl diamide (urea), acrylic acid, polyvinyl alcohol and a photo-curing agent according to the mass ratio of 80:2:3:17:16:5. Moreover, the anionic surfactant may be APAM, sodium dodecyl benzene sulfonate, fatty acid sulfoalkyl ester and so on, and the photo-curing agent may be phenyl bis(2,4,6-trimethylbenzoyl) phosphine oxide, 2,4-diethylthioxanthone and 1-hydroxy-cyclohexyl-phenyl ketone and so on. The anionic surfactant used herein is sodium dodecyl benzene sulfonate. As such, sodium dodecyl benzene sulfonate may act synergistically with urea, thus possessing good pest-resistant abilities. In this process, when an insect bites the sealing film, urea and sodium dodecyl benzene sulfonate in the adhesive will be absorbed into the body of the insect. At this time, urea will damage chitin of the insect's body walls, while sodium dodecyl benzene sulfonate will dissolve wax layers on the body walls and adhere thereon to form a waterproof and airtight film. As such, spiracles of the insect will be clogged, and it will die from suffocation. In this manner, storage effects of outer packaging on food packaged inside it are further improved.

Additionally, the thickness of the sealing film may be selected based on actual conditions. Normally, the thickness of the PET layer is 1-3 μm, the thickness of the VMPET layer is 2-6 μm, and the thickness of the PE layer is 2-4 μm.

Examples 2-5 and comparative examples 1 and 2 are provided respectively based on the preparation method of Example 1, which are shown in the table below:

| Formula of PE Layer | Example 2 | Example 3 | Example 4 | Example 5 | Comparative Example 1 | Comparative Example 2 |
|---|---|---|---|---|---|---|
| PE/Kg | 110 | 105 | 100 | 105 | 110 | 105 |
| EVA/Kg | 20 | 17 | 17 | 15 | 20 | 17 |
| EAA/Kg | 20 | 18 | 20 | 15 | 20 | 18 |
| HDPE/Kg | 60 | 57 | 55 | 57 | / | / |
| LLDPE/Kg | 15 | 13 | 10 | 15 | / | / |

Meanwhile, the sealing film of examples 1-5 and comparative examples 1 and 2 are tested respectively in accordance with the Detection Standard GB/T10004-2008, wherein the detected sealing films had a same thickness of 8 μm, and the results as shown in the table below are obtained:

| Testing Item | Example 1 | Example 2 | Example 3 | Example 4 | Example 5 | Comparative Example 1 | Comparative Example 2 | Standard |
|---|---|---|---|---|---|---|---|---|
| Maximum Force of Stretching/N | 60.8 | 62.4 | 61.3 | 61.0 | 61.8 | 51.3 | 50.7 | 60.1 |
| Stretching Elongation/% | 31.5 | 29.4 | 30.8 | 31.2 | 30.4 | 43.4 | 45.2 | 39.6 |
| Maximum Force of Peeling/N | 3.5 | 3.8 | 3.6 | 3.7 | 3.5 | 2.1 | 1.9 | 3.4 |
| Peeling Strength/MPa | 2.5 | 3.0 | 2.8 | 2.6 | 2.7 | 1.6 | 1.2 | 2.2 |

First, the results of mechanical testing for the sealing film of the present invention all comply with relevant criteria of GB/T10004-2008. Secondly, based on the comparison among Examples 2 and 3 as well as Comparative examples 1 and 2, it is quite clear that in the present invention, after the addition of HDPE and LLDPE, the overall tensile strength is obviously improved. As such, when package unsealing is done by pulling, the sealing film may be effectively avoided from being torn up, thereby ensuring the convenience of food taking.

Examples 6-8 is provided on the basis of the preparation method of Example 1, wherein the shell powder as shown in the table below is also added according to Examples 1-3 respectively:

| Component | Example 6 | Example 7 | Example 8 |
|---|---|---|---|
| Shell Powder/Kg | 2 | 5 | 3.5 |

The shell powder is treated via the following method:

A sodium sulfite buffer solution having a pH value of 8.0 is formulated, and a small amount of triton is used as a surfactant. Then, a combination of alkaline protease, papain and trypsin are used for catalyzation respectively for Examples 6-8, and the shell powder is soaked into the solution. Thereafter, hydrolysis is conducted for 2 hours under the conditions that the temperature of a constant-temperature shaker is controlled to be 50° C., and the rotation speed is controlled to be 300 r/min.

Sealing films of 1 cm$^2$ are taken respectively from Examples 1-3 and 6-8. A nutrient solution having 10 cfu of Escherichia coli is dripped to each sealing film. Thereafter, the sealing films are placed in an incubator of 35° C. for 24 hours. After that, they are taken out, and bacterial colonies propagating on them are tested to obtain the results as shown in the table below:

| Name of Bacterial Colony | Example 1 | Example 2 | Example 3 | Example 3 | Example 7 | Example 8 |
|---|---|---|---|---|---|---|
| Bacterial Colony of *Escherichia Coli*/cfu | 506 | 510 | 504 | 1 | 0 | 0 |

It can also be seen clearly from the above table that the sealing film of the present invention also has strong bacteriostatic properties. This feature helps prolong the storage time of food.

Additionally, sealing films in Examples 1-8 are placed respectively in the environment of 0° C., −10° C., −20° C., −30° C., −40° C., −50° C., −60° C. and −70° C. for 1 hour. Then, observations are conducted to check whether there are changes in the shapes of various sealing films:

| Temperature | Example 1 | Example 2 | Example 3 | Example 4 | Example 5 | Example 6 | Example 7 | Example 8 |
| --- | --- | --- | --- | --- | --- | --- | --- | --- |
| 0° C. | Unchanged | Unchanged | Unchanged | Unchanged | Unchanged | Unchanged | Unchanged | Unchanged |
| −10° C. | Unchanged | Unchanged | Unchanged | Unchanged | Unchanged | Unchanged | Unchanged | Unchanged |
| −20° C. | Unchanged | Unchanged | Unchanged | Unchanged | Unchanged | Unchanged | Unchanged | Unchanged |
| −30° C. | Unchanged | Unchanged | Unchanged | Unchanged | Unchanged | Unchanged | Unchanged | Unchanged |
| −40° C. | Unchanged | Unchanged | Unchanged | Unchanged | Unchanged | Unchanged | Unchanged | Unchanged |
| −50° C. | Unchanged | Unchanged | Unchanged | Unchanged | Unchanged | Unchanged | Unchanged | Unchanged |
| −60° C. | Unchanged | Unchanged | Unchanged | Unchanged | Unchanged | Unchanged | Unchanged | Unchanged |
| −70° C. | Damaged | Unchanged | Damaged | Unchanged | Unchanged | Damaged | Unchanged | Damaged |

It can be seen clearly from the above table that the sealing film of the present invention still can maintain its original form in the environment of −60° C. This feature may have relatively good protection effects on food stored at low temperature.

The specific embodiments described herein are merely illustrative of the present invention, and not intended to limit the present invention. Upon reading this description, those skilled in the art may make modifications with no creative contributions to the above embodiments according to requirements, but all the modifications that fall within the scope of claims of the present invention shall be protected by the Patent Law.

What is claimed is:

1. A preparation method of a sealing film suitable for food packaging, comprising the following steps:
    applying an adhesive on both surface of a vacuum metalized polyethylene terephthalate (VMPET) layer, wherein the adhesive is formed by the mixing of corn flour, an anionic surfactant, carbonyl diamide, acrylic acid, polyvinyl alcohol and a photo-curing agent according to the mass ratio of 80:2:3:17:16:5;
    gluing a polyethylene terephthalate (PET) layer to the lower side of the VMPET layer and a polyethylene (PE) layer to the upper side of the VMPET layer;
    simultaneously squeezing and clamping the PET layer, the PE layer and the VMPET layer by a pair of nipping rollers to obtain a semi-finished film;
    drying the semi-finished film;
    irradiating the semi-finished film by UV; and
    rolling the semi-finished film to obtain a finished sealing film.

2. The preparation method of the sealing film suitable for food packaging according to claim 1, wherein a preparation method of the PE layer comprises the following steps:
    adding all raw materials into a mixer for melting and mixing according to the prescribed mass parts;
    transferring the raw materials to a twin-screw extruder for extrusion and pelletization to obtain PE master batches; and
    adding the PE master batches into a drawing machine to be drawn into a film.

3. The preparation method of the sealing film suitable for food packaging according to claim 1, wherein intensity of the UV is 30,000 W/(scm$^2$), and the irradiating time of the UV is 5 seconds.

4. The preparation method of the sealing film suitable for food packaging according to claim 1, wherein the drying step is performed in an oven, hot air in the oven is blown respectively towards the semi-finished film in the direction perpendicular to the surfaces on both sides of the semi-finished film, and hot air blown from the two sides is symmetrical with respect to the semi-finished film.

* * * * *